United States Patent
Sabarese et al.

(10) Patent No.: US 7,052,558 B1
(45) Date of Patent: May 30, 2006

(54) SOLDER PASTE FLUX COMPOSITION

(75) Inventors: Daniel M. Sabarese, Yonkers, NY (US); Mark A. Sabarese, Bronx, NY (US); Harold A. Stuhler, Allenwood, NJ (US)

(73) Assignee: Chemicals and Metals Technologies, Inc., Bronx, NY (US)

( * ) Notice: Subject to any disclaimer, the term of this patent is extended or adjusted under 35 U.S.C. 154(b) by 0 days.

(21) Appl. No.: 11/101,510

(22) Filed: Apr. 8, 2005

(51) Int. Cl.
*B23K 35/365* (2006.01)

(52) U.S. Cl. ...................................... 148/23
(58) Field of Classification Search .................. 148/23
See application file for complete search history.

(56) References Cited

U.S. PATENT DOCUMENTS

| | | | |
|---|---|---|---|
| 2,880,126 A | 3/1959 | Jordan et al. | |
| 2,895,862 A | 7/1959 | Laudenslager, Jr. | |
| 2,978,369 A | 4/1961 | Battle et al. | |
| 3,099,590 A | 7/1963 | Laudenslager, Jr. | |
| 3,220,892 A | 11/1965 | Durham, Jr. | |
| 3,436,278 A | 4/1969 | Poliak et al. | |
| 3,796,610 A | 3/1974 | Sarnacki et al. | |
| 3,902,928 A | 9/1975 | Yen et al. | |
| 4,151,015 A * | 4/1979 | Cooper | 148/23 |
| 4,342,607 A * | 8/1982 | Zado | 148/23 |
| 4,708,751 A * | 11/1987 | Froebel et al. | 148/23 |
| 4,872,928 A | 10/1989 | Jacobs | |
| 4,895,606 A | 1/1990 | Jafri | |
| 5,011,546 A * | 4/1991 | Frazier et al. | 148/23 |
| 5,041,169 A * | 8/1991 | Oddy et al. | 148/23 |
| 5,122,201 A * | 6/1992 | Frazier et al. | 148/23 |
| 5,215,602 A | 6/1993 | Ali et al. | |
| 5,308,402 A * | 5/1994 | Bixenman et al. | 134/2 |
| 5,443,660 A | 8/1995 | Gao et al. | |
| 5,452,840 A * | 9/1995 | Turner | 228/180.1 |
| 5,571,340 A * | 11/1996 | Schneider et al. | 148/23 |
| 6,474,536 B1 * | 11/2002 | Kukanskis | 228/207 |
| 6,524,398 B1 * | 2/2003 | Arora et al. | 148/23 |
| 2002/0017337 A1* | 2/2002 | Arora et al. | 148/25 |

FOREIGN PATENT DOCUMENTS

GB    2243842 A * 11/1991

* cited by examiner

*Primary Examiner*—Daniel Jenkins
(74) *Attorney, Agent, or Firm*—Stites & Harbison PLLC; Ross F. Hunt, Jr.

(57) ABSTRACT

A soldering paste flux for use in soldering copper and copper alloy piping and the like is formed of 40–70% nonylphenol ethoxylate (preferably Tergitol NO-10® made by Dow Chemical), 10–30% glyceryl monostearate, 3–10% acid activator, 3–10% water, and 4–15% mineral salt. The acid activator is preferably a mineral acid and, most preferably, hydrobromic acid. The mineral salt is preferably zinc bromide.

10 Claims, No Drawings

SOLDER PASTE FLUX COMPOSITION

FIELD OF THE INVENTION

The present invention relates to soldering paste fluxes for use in soldering copper pipe and the like.

BACKGROUND OF THE INVENTION

Most soldering paste fluxes currently in use are petrolatum-based and usually contain zinc and ammonium chloride. The use of petrolatum is disadvantageous because petrolatum is not water soluble and leaves a greasy residue behind. Further, in a typical solder paste flux formulation, the residue contains zinc and ammonium chloride which is corrosive to copper pipe.

There are a relatively large number of patents in the broad field of soldering fluxes, and some of these patents are discussed below.

U.S. Pat. No. 4,895,606 to Jafri discloses a soldering flux composition comprising a water soluble oil-in-water emulsion paste comprised of an oil type material (such as, e.g., petrolatum), an emulsifier such as glyceryl monostearate and alcohol, a substantial amount of water and a fluxing agent.

U.S. Pat. No. 3,796,610 to Sarnacki et al discloses water soluble soldering fluxes used in soldering electrical surface soldering connections and printed circuits. The fluxes principally comprise glycerol (80% to 90%) and include hydrochloric acid and tartaric acid.

U.S. Pat. No. 3,436,278 to Poliak discloses glycol soldering fluxes used in soldering electrical connections. The fluxes are generally comprised of glutamic acid hydrochloride polyglycols and alkyl alcohols.

U.S. Pat. No. 4,872,928 to Jacobs discloses a water-soluble paste for electronic circuits consisting essentially of a solder powder (e.g., a Sn/Pb alloy), a water-soluble organic activator (e.g., a mixture of 2-ethyl hexyl amine hydrobromide, triethanolamine and citric acid) and a polyethylene vehicle.

U.S. Pat. No. 5,215,602 to Ali et al discloses a water-soluble flux for printed circuit boards including a vehicle including at least two random copolymers of polyalkylene glycol with various amounts of ethylene oxide and propylene oxide. The flux includes a relatively large amount of water as well as a number of other constituents including hydrobromic acid.

U.S. Pat. No. 3,220,892 to Durham discloses soldering fluxes adapted for use in soldering copper and copper-based alloys wherein the fluxes consist essentially of a water solution of a water-soluble salt of an acid of a particular character. A relatively large number of acids are mentioned including hydrobromic acid.

U.S. Pat. No. 2,978,360 to Battle et al discloses soldering fluxes which are said to be substantially residue-free and which consist essentially of ammonium halides and substituted ammonium halides, and hydrogen bromide as uncombined hydrobromic acid.

U.S. Pat. No. 2,880,126 to Jordan et al discloses soldering fluxes for the joining and the coating of metals which include, inter alia, a large percentage (preferably 80 to 90%) of amine hydrohalide or combination of hydrohalides.

U.S. Pat. No. 5,443,660 to Gao et al, discloses a water-based, "no-clean" flux formulation for electronic and circuit boards comprising a solvent, a water soluble weak organic acid, a halide-free, non-ionic surfactant (such as, e.g., Tergitol TMN-6), and a biocidal co-solvent.

U.S. Pat. No. 3,902,928 to Yen et al discloses a metal joining flux wherein the active fluxing ingredients are cupric chloride and zinc chloride. Wetting agents such as Tergitol may be added to the active fluxing ingredients.

U.S. Pat. Nos. 2,895,862 and 3,099,590, both to Laudenslager, Jr., disclose solder fluxes for soft solders and the like wherein the fluxes include, inter alia, a small amount of a wetting agent such as, among others, Tergitol EH, Tergitol XD and Tergitol #4.

SUMMARY OF THE INVENTION

In accordance with the invention, there is provided a soldering paste flux which addresses and, to a large extent, overcomes, the problems with soldering paste fluxes currently in actual use for soldering copper and copper-alloy pipe and copper and copper-alloy flashing. Although it is contemplated that the soldering paste flux of the invention would typically be employed for such uses in that it is particularly advantageous in such uses, the invention also has application in the stained glass industry and in connection with radiators. The soldering paste flux of the invention differs from many of the soldering fluxes discussed above in that the soldering flux of the invention is concerned with different problems than those posed in soldering printed circuit boards and in this regard, the soldering flux of the invention is unsuitable for such a use because of the highly corrosive nature thereof.

According to the invention, a soldering paste flux is provided which comprises 40–70% nonylphenol ethoxylate, 10–30% glyceryl monostearate, 3–10% acid activator, 3–10% water and 4–15% mineral salt. The glyceryl monostearate base is soluble in hot or cold water and has the further advantage of being a good solvent of copper oxide which must be dissolved by the flux to facilitate soldering. The acid activator, which can be viewed as a substitute for the zinc and aluminum chloride used in the prior art solder fluxes first discussed above, is also water soluble and, moreover, decomposes at soldering temperatures so that no corrosive residues are left behind.

The acid activator is preferably a mineral acid and more preferably hydrobromic acid, although other mineral acids such as hydrochloric acid can also be used as can organic acids such as succunic acid, tartaric acid, azealeic acid and glutamic acid, as well as organo-halides such as glutamic acid hydrochloride. The mineral salt is preferably zinc bromide.

In a preferred embodiment, the paste flux comprises 40–70% $C_{35}H_{64}O_{11}$ (more preferably Tergitol NP-10® made by Dow Chemical), 10–30% glyceryl monostearate, 3–10% hydrobromic acid, 3–10% water, and 4–15% zinc bromide. In a specific, more preferred embodiment, the paste flux comprises about 20% glyceryl monostearate, about 62% $C_{35}H_{64}O_{11}$ (again, preferably Tergitol NP-10® made by Dow Chemical), about 4.5% hydrobromic acid, about 4.5% water and about 9.0% zinc bromide.

Further features and advantages of the present invention will be set forth in, or apparent from, the detailed description of preferred embodiments thereof which follows.

DESCRIPTION OF THE PREFERRED EMBODIMENTS

As indicated above, according to the invention, there is provided a soldering paste flux which overcomes or largely ameliorates the problems with prior art soldering paste fluxes currently in actual use for the purposes of the present invention. As stated, the soldering paste flux of the invention preferably comprises 40–70% nonylphenol ethoxylate, 10–30% glyceryl monostearate, 3–10% acid activator, 3–10% water and 4–15% mineral salt. The glyceryl monostearate base is soluble in hot or cold water and has the further advantage of being a good solvent of copper oxide which must be dissolved by the flux to facilitate soldering. The acid activator, which, as noted above, can be viewed as a substitute for the zinc and aluminum chloride used in the above-mentioned prior art solder fluxes, is also water soluble and, moreover, decomposes at soldering temperatures so that no corrosive residues are left behind.

As indicated above, the acid activator is preferably a mineral acid, and most preferably, hydrobromic acid, although other mineral acids such as hydrochloric acid can also be used as can organic acids such as succunic acid, azealeic acid, glutamic acid, and tartaric acid. Organohalides such as glutamic acid hydrochloride can also be employed.

The nonylphenol ethoxylate preferably comprises a Tergitol and, more preferably, Tergitol NP-10®, made by Dow Chemical.

The mineral salt preferably comprises zinc bromide.

In a preferred embodiment, the past flux comprises 40–70% $C_{35}H_{64}O_{11}$, (more preferably Tergitol NP-10® made by Dow Chemical), 10–30% glyceryl monostearate, 3–10% hydrobromic acid, 3–10% water, and 4–15% zinc bromide. In a specific, more preferred embodiment, the paste flux comprises about 20% glyceryl monostearate, about 62% $C_{35}H_{64}O_{11}$ (again preferably Tergitol NP-10® made by Dow Chemical), about 4.5% hydrobromic acid, about 4.5% water and about 9.0% zinc bromide.

In a specific nonlimiting example, the soldering paste is prepared by adding Tergitol N-10® to a kettle or the like and heating the same to 160° F. The glyceryl monostearate is then added, melted and mixed with the Tergitol N-10®. When the glyceryl monostearate is completely mixed in, the hydrobromic acid and zinc bromide are added. The mixture is then drained into buckets or other containers so as to cool. After cooling, the mixture is homogenized in a Hobart mixer for approximately 10 minutes. Thereafter the mixture is ready for packaging.

Although the invention has been described above in relation to preferred embodiments thereof, it will be understood by those skilled in the art that variations and modifications can be effected in these preferred embodiments without departing from the scope and spirit of the invention.

The invention claimed is:

1. A soldering paste composition flux comprising:
   40–70% nonylphenol ethoxylate;
   10–30% glyceryl monostearate;
   3–10% acid activator
   3–10% water; and
   4–15% mineral salt.

2. A composition as claimed in claim 1 wherein the acid activator comprises a mineral acid.

3. A composition as claimed in claim 2 wherein said mineral acid comprises hydrobromic acid.

4. A composition as claimed in claim 3 wherein the mineral salt comprises zinc bromide.

5. A composition as claimed in claim 2 wherein said mineral acid comprises hydrochloric acid.

6. A composition as claimed in claim 1 wherein said acid activator comprises an organic acid.

7. A composition as claimed in claim 6 wherein said organic acid comprises succunic acid.

8. A composition as claimed in claim 6 wherein said organic acid comprises azealeic acid.

9. A composition as claimed in claim 3 wherein the flux comprises about 20% glyceryl monostearate, about 62% $C_{35}H_{64}O_{11}$, about 4.5% hydrobromic acid, about 4.5% water and about 9.0% zinc bromide.

10. A soldering paste composition flux comprising:
    40–70% $C_{35}H_{64}O_{11}$;
    10–30% glyceryl monostearate;
    3–10% hydrobromic acid;
    3–10% water; and
    4–15% zinc bromide.

* * * * *